June 2, 1936.  F. G. SHOEMAKER  2,043,014

RETAINING MEANS FOR PISTON PIN ROLLER BEARINGS

Filed Oct. 11, 1934

Inventor
Fred G. Shoemaker
By Blackmore, Spencer & Flint
Attorneys

Patented June 2, 1936

2,043,014

UNITED STATES PATENT OFFICE 2,043,014

RETAINING MEANS FOR PISTON PIN ROLLER BEARINGS

Fred G. Shoemaker, Detroit, Mich., assignor to General Motors Corporation, Detroit, Mich., a corporation of Delaware Application October 11, 1934, Serial No. 747,839

4 Claims. (Cl. 308—186)

This invention relates to piston assembly construction in internal combustion engines, and more particularly to retaining means for roller bearings between the wrist pin and the connecting rod.

It is common practice to use the conventional bronze bearing in the end of the connecting rod that fits within the piston and engages the wrist pin. However, in certain installations, such as two-cycle Diesels, it has been found advantageous to utilize roller bearings on account of the difficulty of lubricating a plain bearing. With the use of roller bearings the race is free to creep rotatable to even the wear on all parts of the bearing, and it is necessary to provide some means to prevent the bearings and the race from moving axially and it is the object of this invention to provide such means.

With this and other objects in view, my invention resides in the construction as set forth in the specification, claimed in the claims and illustrated in the accompanying drawing, in which:

Figure 1:
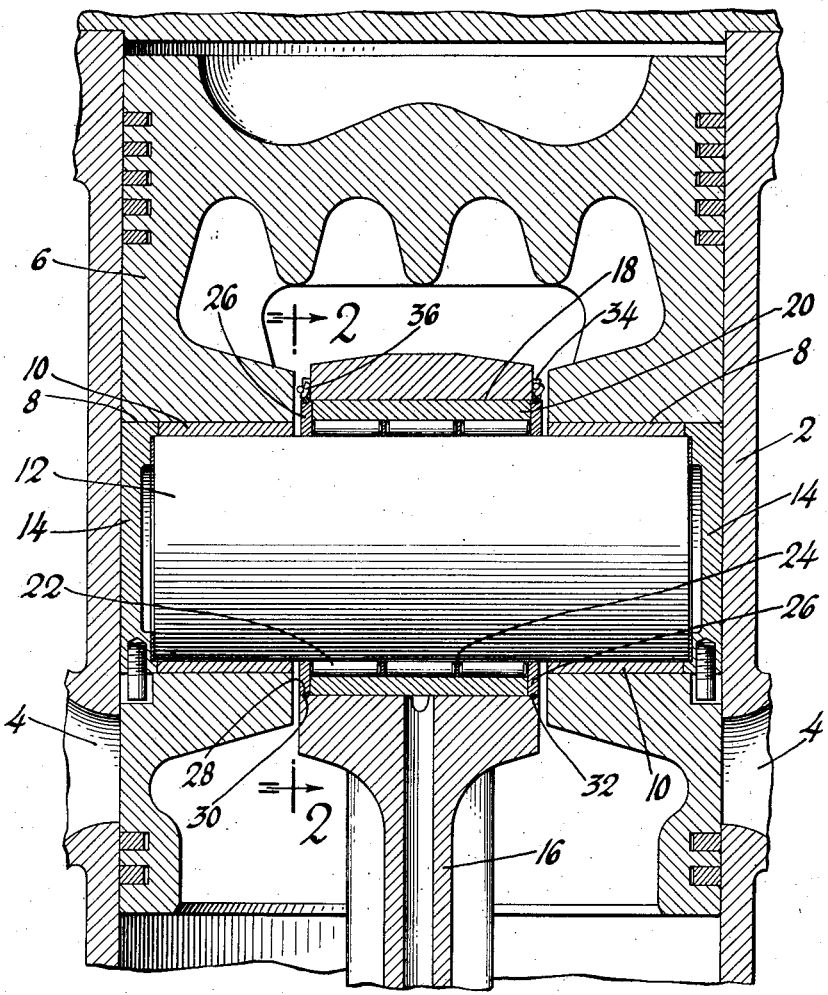
Figure 1 is a vertical section through a cylinder and piston of a motor.
Figure 2:
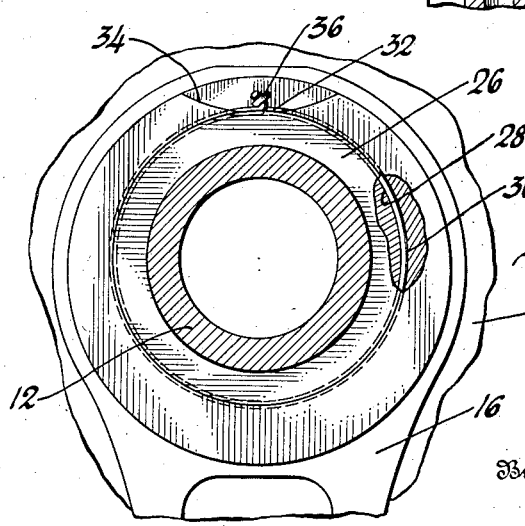
Figure 2 is a sectional view taken on the line 2—2 of Figure 1.

In the drawing, 2 indicates a cylinder of an engine having ports 4 in the wall thereof. Within the cylinder is a piston 6 having an opening 8 diametrically through the piston skirt. A bearing 10 is press fitted into the opening on each side of the skirt and wrist pin 12 is positioned with each end in one of the bearings. A block 14 is fitted in each outside end of the opening beyond the end of the wrist pin to prevent axial movement of the same and consequent rubbing on the sides of the cylinder.

A connecting rod 16 has an opening 18 through the upper end thereof which surrounds the central portion of the wrist pin intermediate the piston skirt. Within the opening 18 is a cylindrical roller bearing race 20 which incloses the roller bearings 22 in contact with the wrist pin. Three rows of roller bearings are shown though of course a various number of rows may be used depending on the requirements of the installation. Two spacers 24 are inserted to keep the rows of rollers apart. The ends of the race member 20 are not flush with the side of the connecting rod, but are indented a short distance. Inserted in this space on each end of the race are two annular retainers 26 which extend from the wrist pin to the interior of the bore 18 to keep the rollers in the end compartments and the outer race from axial movement.

In the outer peripheral face of the washers is cut a circular groove 28, and on the inside surface of the bore 18 adjacent the ends is cut a matching circular groove 30. The diameter of these grooves is approximately the same as that of a wire 32 which is inserted in the circular hole formed when the retainers are in position to retain them in the ends of the connecting rod bore. The top portion of the end of the connecting rod is broken away as at 34 down to the periphery of the retainer, so that the wire may be fed into the hole at this point and the two ends may be twisted as at 36 to secure them together.

In this manner the outer ends of the roller bearings are covered and the roller bearing assembly is prevented from having any axial movement in the end of the connecting rod.

I claim:

1. In a connecting rod for use in an internal combustion engine, an opening through one end, a roller bearing assembly fitted within the opening, a solid annular retainer fitted flush in each end of the opening and abutting the bearing assembly to keep it in place, and detachable securing means removably engaging both the retainer and the rod end.

2. In a connecting rod for use in internal, combution engines, an opening through one end of the rod, a roller bearing race fitted within the opening, roller bearings carried by the race, spacers between adjacent rows of rollers, an annular retainer fitting inside of the opening in the connecting rod and abutting the ends of the race and rollers to keep them in place, matching annular grooves in the outside periphery of the retainer and inside circumference of the opening, a pocket in the side face of the rod end aligned with said grooves and a wire threaded through this pocket into keying relation within the grooves to secure the retainers in place.

3. The combination with an apertured connecting rod end and a closure ring fitted into one end of the aperture, of means to key the ring and rod end including a wire lying within mating circular grooves in the ring and rod end with the ends thereof twisted together within a relieved portion in the side face of the rod end.

4. In a connecting rod having an apertured end to receive a piston pin, a floating bearing race rotatably fitted to said end and being of such axial length as to end short of the opposite side faces of the rod, roller bearings riding said race, retainer washers closing opposite ends of the aperture to prevent displacement of the race and rollers and so arranged that their outer faces are flush with the side faces of the rod, a wire extending through an annular keyway formed partly in each of the abutting surfaces of the rod and each washer to secure the parts together, and recessed portions in the rod in radial alinement with the washers to receive the twisted ends of the respective key wires.

FRED G. SHOEMAKER.